(12) United States Patent
Vajravel et al.

(10) Patent No.: US 10,409,494 B2
(45) Date of Patent: Sep. 10, 2019

(54) ENABLING REDIRECTION OF MASS STORAGE DEVICES OF ANY INTERFACE

(71) Applicant: Wyse Technology L.L.C., Santa Clara, CA (US)

(72) Inventors: Gokul Thiruchengode Vajravel, Bangalore (IN); Ramanujam Kaniyar Venkatesh, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 190 days.

(21) Appl. No.: 15/418,131

(22) Filed: Jan. 27, 2017

(65) Prior Publication Data

US 2018/0217764 A1  Aug. 2, 2018

(51) Int. Cl.
*G06F 3/06* (2006.01)

(52) U.S. Cl.
CPC ........... *G06F 3/0607* (2013.01); *G06F 3/067* (2013.01); *G06F 3/0661* (2013.01); *G06F 3/0664* (2013.01)

(58) Field of Classification Search
None
See application file for complete search history.

(56) References Cited

U.S. PATENT DOCUMENTS

| | | | | |
|---|---|---|---|---|
| 7,509,436 B1* | 3/2009 | Rissmeyer | ............ | G06F 13/102 709/249 |
| 7,908,404 B1* | 3/2011 | Lok | ..................... | H04L 67/1097 709/212 |
| 8,464,238 B1* | 6/2013 | Chakraborty | ....... | H04L 67/1097 709/220 |
| 8,554,957 B1* | 10/2013 | Wieland | ................ | G06F 9/4411 710/8 |
| 9,251,025 B1* | 2/2016 | Dykes | ..................... | G06F 11/181 |
| 2006/0080679 A1* | 4/2006 | Parry | ..................... | G06F 9/4411 719/327 |
| 2006/0190505 A1* | 8/2006 | DeMaio | .............. | G06F 11/1451 |
| 2009/0144532 A1* | 6/2009 | Arafeh | ..................... | H04L 67/34 713/2 |
| 2009/0150550 A1* | 6/2009 | Barreto | ............. | H04L 29/08846 709/228 |
| 2010/0217750 A1* | 8/2010 | Tokoro | .............. | G06F 17/30179 707/640 |
| 2010/0250896 A1* | 9/2010 | Matze | ................... | G06F 3/0608 711/216 |

(Continued)

*Primary Examiner* — Tuan C Dao
*Assistant Examiner* — William C Wood
(74) *Attorney, Agent, or Firm* — Kirton McConkie; Brian Tucker

(57) ABSTRACT

Mass storage devices of any interface can be redirected to a server. When a mass storage device is connected to a client terminal, a client-side proxy can obtain information about the device including the interface by which the device connects to the client terminal. The proxy can relay this information to a server-side agent which can instruct a VMiniport enumerator to enumerate the mass storage device using the interface specified in the information. When the VMiniport driver is loaded, the agent can also use the information to cause the VMiniport driver and the storport driver to be initialized in accordance with the specified interface. The VMiniport driver and storport driver will therefore be configured to communicate IO requests targeting the mass storage device in a format appropriate for the interface.

20 Claims, 14 Drawing Sheets

(56) References Cited

U.S. PATENT DOCUMENTS

| | | | |
|---|---|---|---|
| 2014/0006683 A1* | 1/2014 | Ratn | G06F 11/1441 |
| | | | 711/102 |
| 2015/0074261 A1* | 3/2015 | Garg | H04L 43/00 |
| | | | 709/224 |
| 2017/0318112 A1* | 11/2017 | Johnsimon | H04L 67/2814 |

* cited by examiner

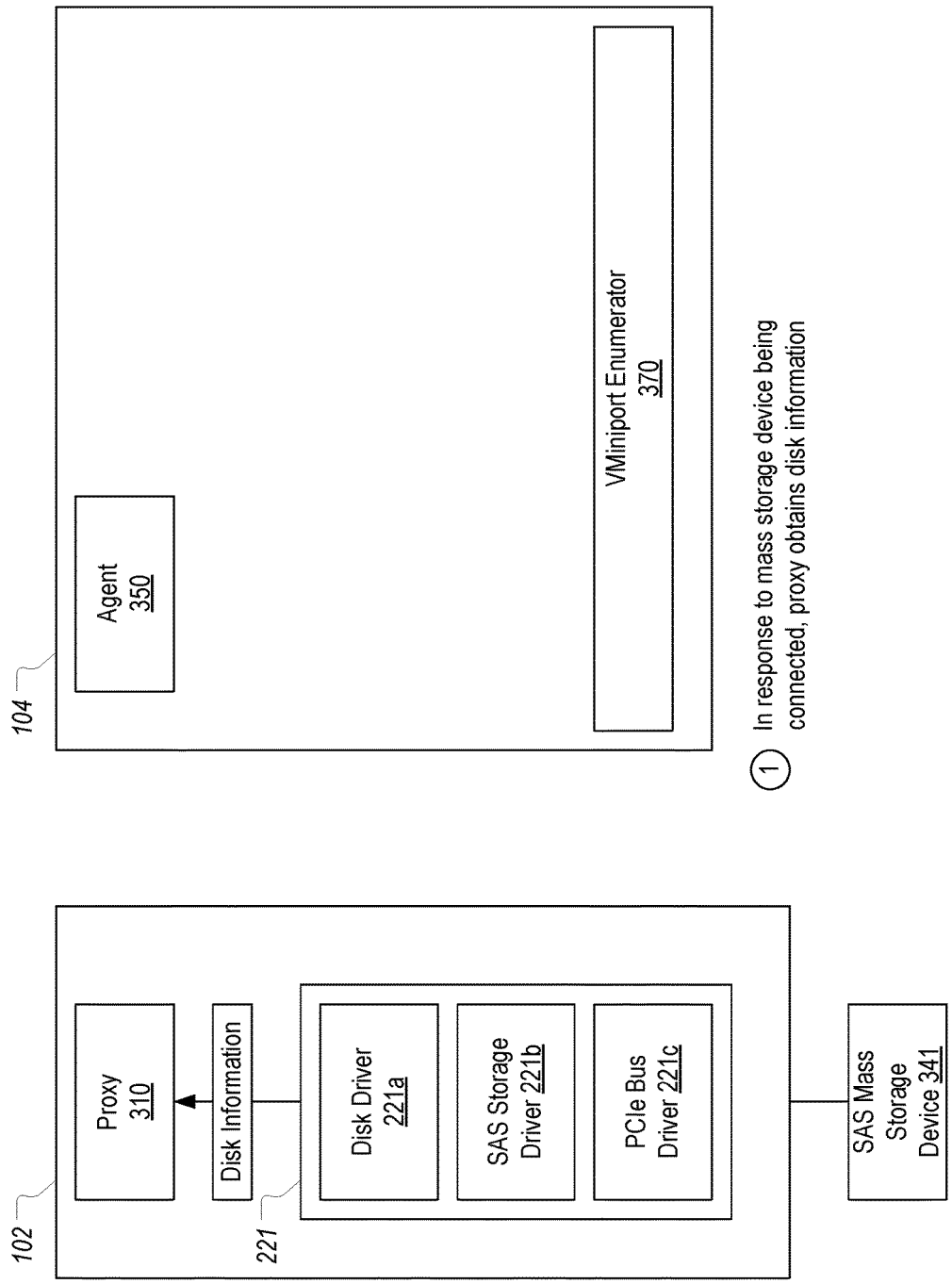

ENABLING REDIRECTION OF MASS STORAGE DEVICES OF ANY INTERFACE

CROSS-REFERENCE TO RELATED APPLICATIONS

N/A

BACKGROUND

The present invention is generally directed to the redirection of mass storage devices in a virtual desktop infrastructure (VDI) environment. Device redirection generally refers to making a device that is connected to a client terminal accessible within a virtual desktop as if the device had been physically connected to the virtual desktop. In other words, when device redirection is implemented, a user can connect a device to his or her client terminal and the device will function as if it had been connected to the server.

FIGS. 1 and 2 and the following description will provide a general overview of how device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client terminal 102 can remotely access applications and data at the server 104 from the client terminal 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client terminal 102 may initiate a remote session with server 104 by sending a request for remote access and credentials (e.g., login name and password) to server 104. If server 104 accepts the credentials from client terminal 102, then server 104 may establish a remote session, which allows a user at client terminal 102 to access applications and data at server 104. During the remote session, server 104 sends display data to client terminal 102 over network 106, which may include display data of a desktop and/or one or more applications running on server 104. The desktop may include, for example, icons corresponding to different applications that can be launched on server 104. The display data allows client terminal 102 to locally display the desktop and/or applications running on server 104.

During the remote session, client terminal 102 may send user commands (e.g., inputted via a mouse or keyboard at client terminal 102) to server 104 over network 106. Server 104 may process the user commands from client terminal 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client terminal 102. Client terminal 102 locally displays the updated display data so that the user at client terminal 102 can view changes at server 104 in response to the user commands. Together, these aspects allow the user at client terminal 102 to locally view and input commands to the desktop and/or application that is running remotely on server 104. From the perspective of the client side, the desktop running on server 104 may represent a virtual desktop environment.

Windows I/O uses a layered architecture where device drivers are on a device stack. In a basic model, the top of the stack is the file system. Next is the volume manager, followed by the disk driver. At the bottom of the device stack are the port and miniport drivers. When an I/O request reaches the file system, it takes the block number of the file and translates it to an offset in the volume. The volume manager then translates the volume offset to a block number on the disk and passes the request to the disk driver. When the request reaches the disk driver it will create a Command Descriptor Block (CDB) that will be sent to the SCSI device. The disk driver imbeds the CDB into a structure called the SCSI_REQUEST_BLOCK (SRB). This SRB is sent to the port driver as part of the I/O request packet (IRP).

The port driver does most of the request processing including providing timing services for requests, enforcing queue depth (making sure that a device does not get more requests that it can handle), and building scatter gather arrays for data buffers. The port driver interfaces with a driver called the miniport. The miniport driver is designed by the hardware manufacturer to work with a specific adapter and is responsible for taking requests from the port driver and sending them to the target logical unit number (LUN). The port driver calls the HwStorStartIo( ) function to send requests to the miniport, and the miniport will send the requests to the LUN. When the request is complete, the miniport will call StorPortNotification( ) with the NotificationType parameter value set to RequestComplete, along with a pointer to the completed SRB.

FIG. 2 is a block diagram of a virtual desktop infrastructure (VDI) environment 200 which can implement this type of functionality when a mass storage device is redirected from a client terminal 102 to a server 104 over a remote session. As shown, while client terminal 102 has established a remote session with server 104, a mass storage device 240 is connected to client terminal 102. In accordance with embodiments of the present invention, client terminal 102 can be configured to redirect device 240 over the remote session so that the device is accessible on server 104. Proxy 210 on client terminal 102 and agent 250 on server 104 can be configured to establish and maintain the remote session to enable this redirection.

FIG. 2 provides a general overview of the primary components that can be employed to redirect mass storage device 240 at the disk level. This technique can be referred to as disk level redirection and is distinguished from general USB redirection in that the redirection occurs at the disk level rather than at the USB device level. In particular, client terminal 102 can include a disk driver stack 220 that includes a disk driver 220a, a USB storage driver 220b, and a USB hub driver 220c. As is known in the art, USB storage driver 220b and USB hub driver 220c can implement the USB protocol to enable communication with device 240 as a USB mass storage device. Disk driver 220a, which in some embodiments may be an instance of the disk.sys process, can function to service read/write requests and to abstract the underlying USB storage and hub drivers 220b, 220c.

When mass storage device 240 is connected to client terminal 102, disk driver 220a may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, disk driver 220 redirects device 240 to server 104 via proxy 210.

Agent 250 may be configured to receive the report from proxy 210 that device 240 is connected to client terminal 102 and the device information. Agent 250 may further be configured to associate with the report from proxy 210 one or more identifiers for client terminal 102 and/or for a user session through which client terminal 102 is connected to server 104, such as a session number or a session locally unique identifier (LUID). Agent 250 can provide notification of device 240, along with the device information, to virtual disk enumerator 260. Virtual disk enumerator 260 may be configured to create and store in memory a record corresponding to device 240, the record including at least part of the device information and session identifiers received from agent 250. Virtual disk enumerator 260 may be configured to report to operating system 170 of server 104 that device 240 is connected and to provide the device information to the operating system. This allows the operating system of server 104 to recognize the presence of device 240 even though device 240 is connected to client terminal 102.

Based on the device information, operating system 170 may load a corresponding disk driver 282, which may be another instance of the disk.sys process, which may sit below a file system stack 280 to receive and convert file system requests to disk requests (e.g., by creating a CDB and embedding it in an SRB) and to pass these disk requests (e.g., IRPs and associated SRBs) to virtual disk enumerator 260 at the bottom of the device stack. It is noted that a volume manager is not shown in this figure for simplicity. Virtual disk enumerator 260 functions to virtualize mass storage device 240 on server 104 (as represented by virtual mass storage device 290). This virtualization is accomplished by routing the disk requests to agent 250 which will forward them over the remote session to proxy 210, down through disk driver stack 220, and to mass storage device 240 where they can be fulfilled. Corresponding responses can then be routed in a reverse direction towards virtual disk enumerator 260 and up through disk driver 282, file system stack 280, operating system 170, and ultimately to an application 270 that originated the request.

It is to be understood that an IRP itself is not transferred between proxy 210 and agent 250 (since much of the IRP is server-specific (e.g., pointers) and would therefore be meaningless on the client). Instead, sufficient content of the IRP is transferred from agent 250 to proxy 210 to allow proxy 210 to recreate (or to cause to be recreated) an equivalent IRP on the client side. A similar process is employed when proxy 210 returns results of handling an IRP.

In the above described architecture, mass storage device 240 must be a USB device. In particular, virtual disk enumerator 260 is a USB-specific component. Therefore, if a mass storage device that employs an interface other than USB, such as, for example, SATA/eSATA, SAS/SSA, Firewire, Thunderbolt, etc., it will not be possible to redirect the mass storage device with this architecture. As a result, the only current option for making a non-USB mass storage device available on a server is to map these devices as network drives. However, network driver mapping has many limitations such as requiring the client terminal to support a mass storage device's file system and preventing many security features.

BRIEF SUMMARY

The present invention extends to methods, systems, and computer program products for enabling the redirection of mass storage devices of any interface. When a mass storage device is connected to a client terminal, a client-side proxy can obtain information about the device including the interface by which the device connects to the client terminal. The proxy can relay this information to a server-side agent which can instruct a VMiniport enumerator to enumerate the mass storage device using the interface specified in the information. When the VMiniport driver is loaded, the agent can also use the information to cause the VMiniport driver and the storport driver to be initialized in accordance with the specified interface. The VMiniport driver and storport driver will therefore be configured to communicate IO requests targeting the mass storage device in a format appropriate for the interface.

In some embodiments, if the operating system of the server does not support an interface employed by the mass storage device, the proxy can modify the information to specify an interface that is supported thereby causing a VMiniport and storport driver that pertain to the supported interface to be loaded on the server. The IO requests targeting the mass storage device will therefore be formatted for the supported interface rather than the actual interface of the mass storage device. The client-side proxy can be configured to convert the IO requests from the server-supported format to the format expected by the actual interface and vice versa to thereby allow mass storage devices with unsupported interfaces to be redirected to the server.

In one embodiment, the present invention is implemented as a method for redirecting a mass storage device. In response to a mass storage device being connected to a client terminal with which a server has established a remote display protocol connection, a server-side agent receives disk information about the mass storage device. The disk information includes an interface by which the mass storage device is coupled to the client terminal. The agent provides at least a portion of the disk information, including the interface, to a VMiniport enumerator. The VMiniport enumerator then causes a VMiniport driver to be loaded and initialized for the interface.

In another embodiment, the present invention is implemented as computer storage media storing computer executable instructions which when executed implement the following components of a virtual desktop infrastructure: a proxy that is configured to execute on a client terminal and to obtain disk information about a mass storage device that is connected to the client terminal, the disk information including an interface by which the mass storage device is coupled to the client terminal; an agent that is configured to execute on a server and to establish a remote display protocol connection with the proxy, the agent being further configured to receive the disk information from the proxy; and a VMiniport enumerator that is configured to execute on the server and to receive the interface included in the disk information from the agent, the VMiniport enumerator being further configured to cause a VMiniport driver for the interface to be loaded.

In another embodiment, the present invention is implemented as a method for redirecting a mass storage device. In response to a mass storage device being connected to a client terminal, a proxy on the client terminal obtains an interface of the mass storage device. The proxy sends the interface to an agent executing on a server. The agent sends a request to create a VMiniport driver to a VMiniport enumerator that is also executing on the server. The request includes the interface. The VMiniport enumerator creates a device object corresponding to the interface.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 4A-4G illustrate a sequence of example steps that can be performed to redirect a mass storage device of any interface;

DETAILED DESCRIPTION

The present invention can be implemented as part of a virtual desktop infrastructure (VDI) environment to enable a mass storage device that employs any interface to be redirected over a remote session at the disk level. A remote session can be established using any remote display protocol including, for example, Microsoft's Remote Desktop Protocol (RDP), Citrix's Independent Computing Architecture (ICA), VMWare's PC-over-IP (PCoIP), Dell's vWorkspace (EOP), etc.

The present invention allows a mass storage device that employs any interface to be redirected at the disk level rather than at the interface level. As a result, non-USB mass storage devices can be redirected. As an overview, this redirection can be accomplished by employing a VDI that includes an interface specific VMiniport enumerator. The VMiniport enumerator can be configured to receive disk information when a mass storage device of any interface is connected to a client terminal and use this disk information to enumerate the mass storage device with the appropriate interface. The server-side stack that is created for the mass storage device can therefore be configured appropriately to allow the server to communicate with the mass storage device over the specific interface.

Figure 3A:
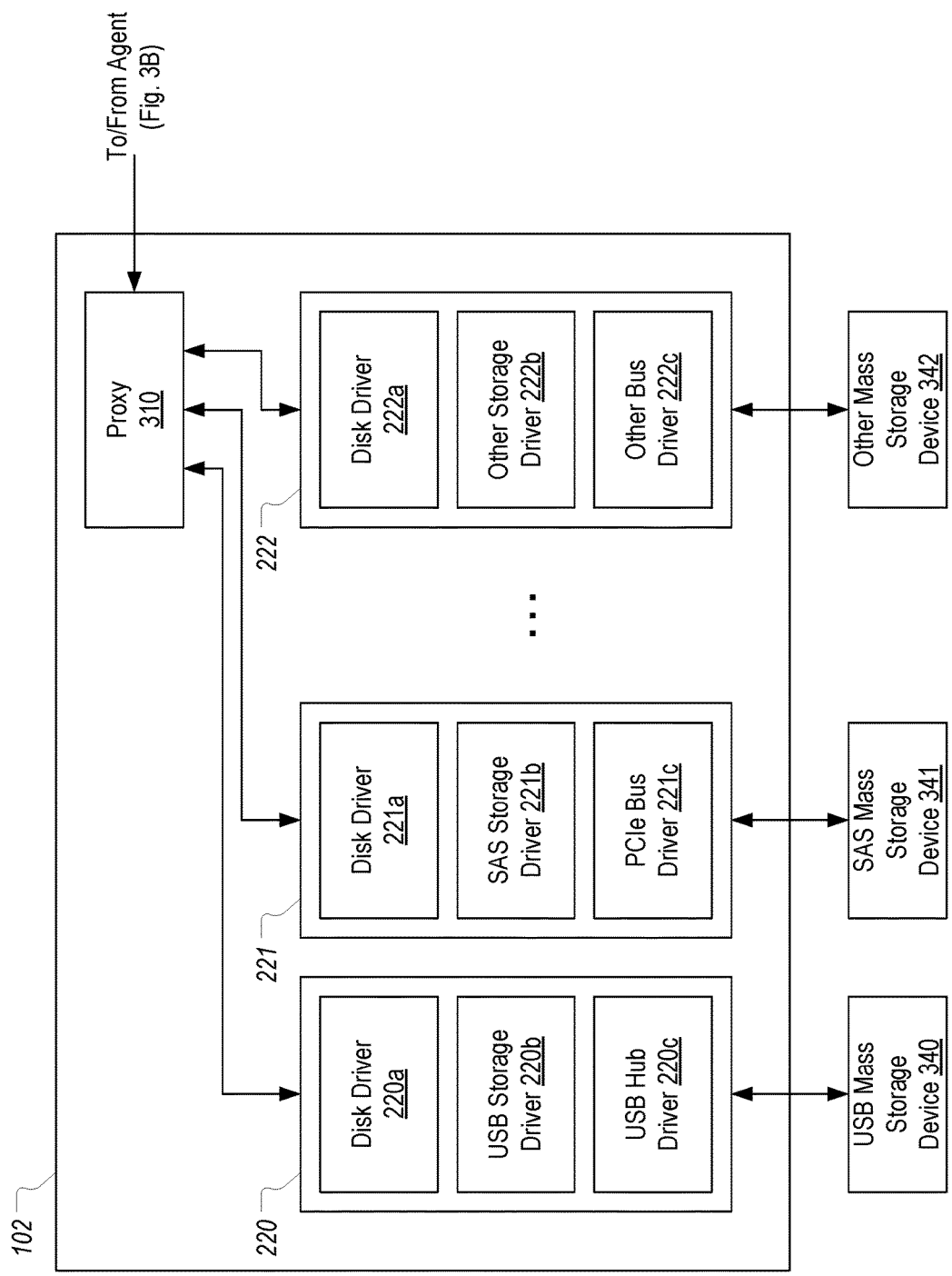
FIGS. 3A and 3B illustrate a VDI environment in which the present invention can be implemented.
Figure 3B:
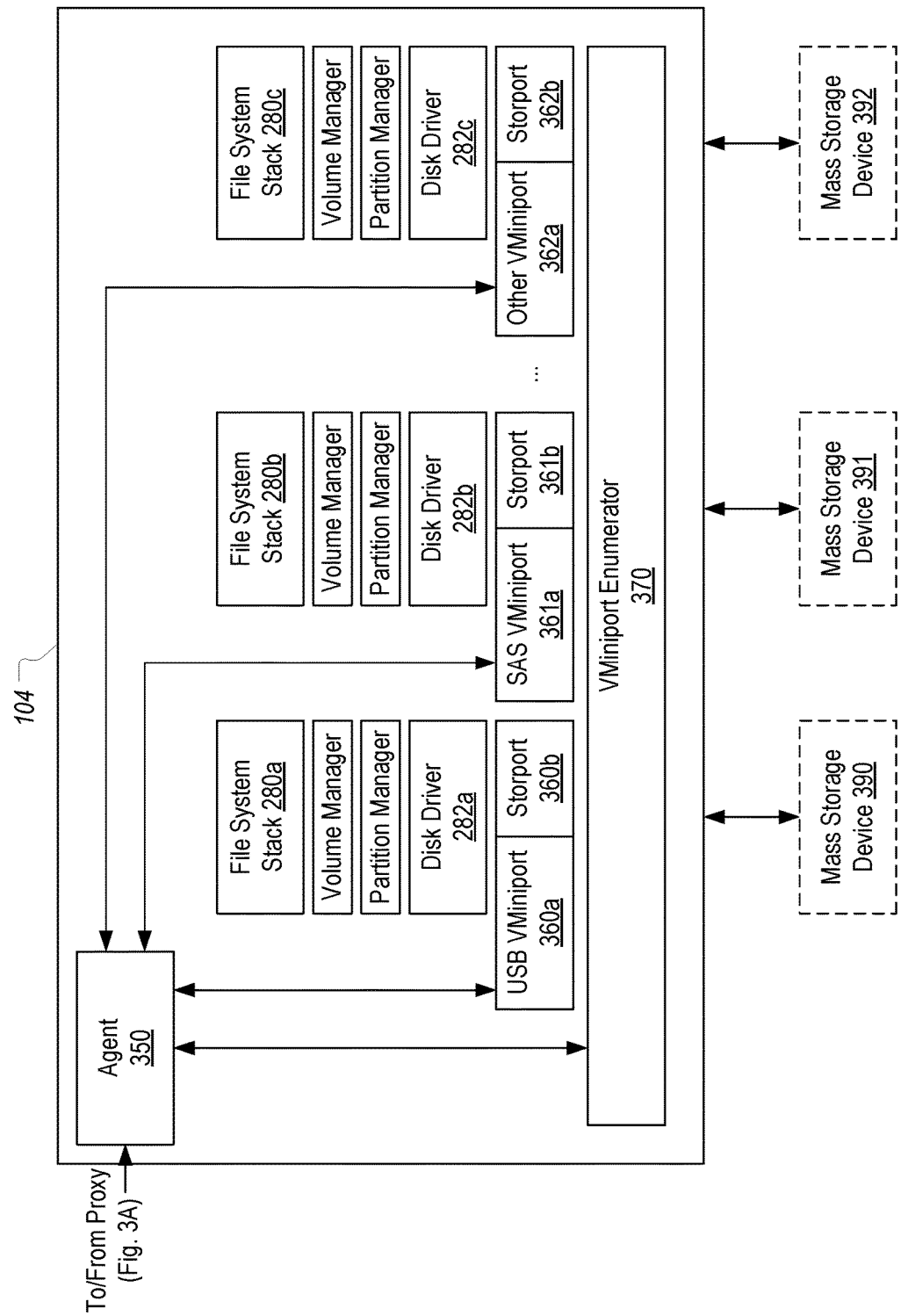

FIGS. 3A and 3B illustrate an example architecture of a VDI environment in which the present invention can be implemented. FIG. 3A depicts the client-side components while FIG. 3B depicts the server-side components. For ease of illustration, operating system 170 and application 270 are omitted from FIG. 3B. However, it is important to note that the present invention can be implemented in a manner that does not require modification to operating system 170. In other words, from the perspective of operating system 170 as well as from the perspective of any applications, access to the redirected mass storage devices can be performed in a standard manner.

Figure 1:
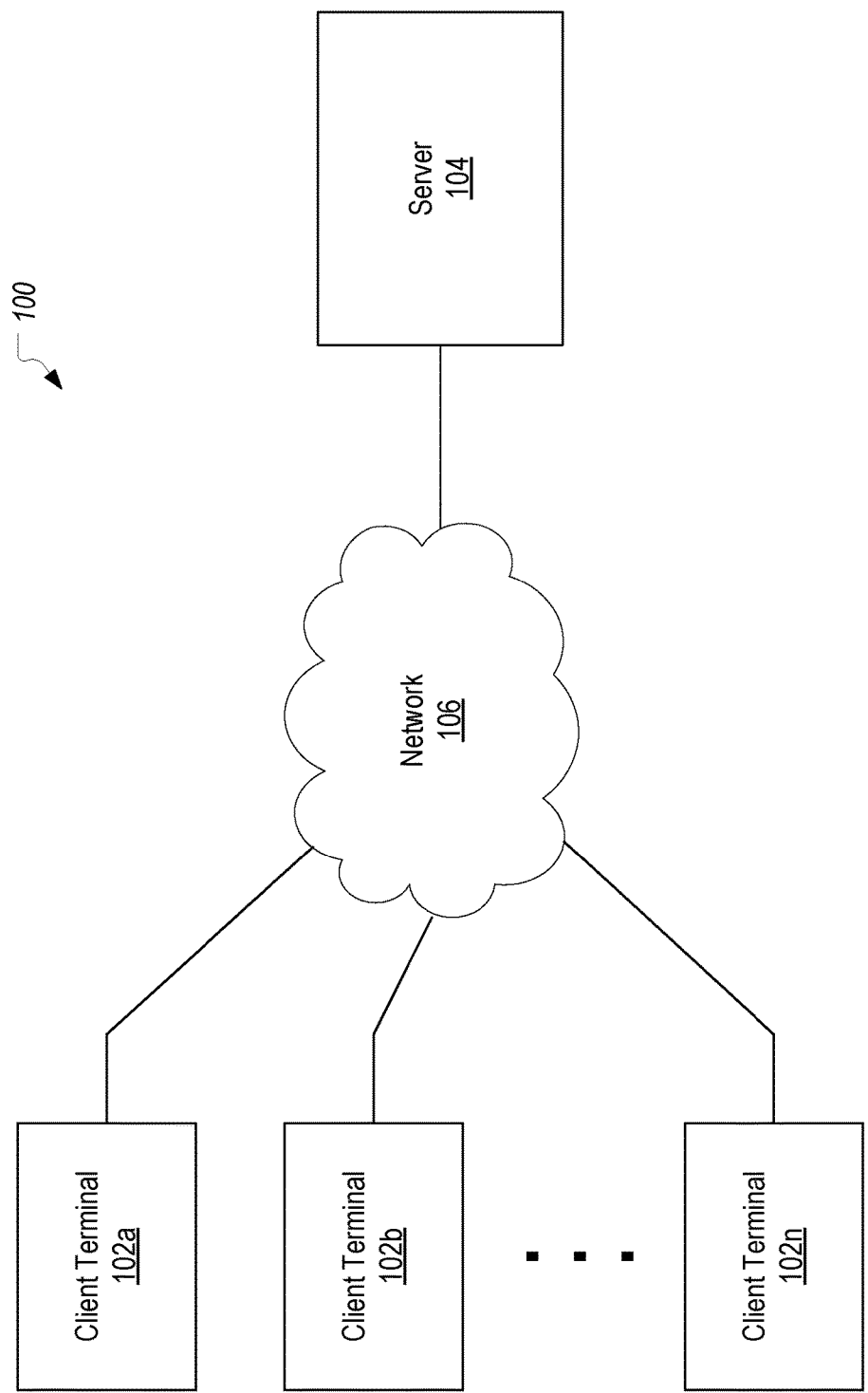
FIG. 1 illustrates an example computing environment in which the present invention can be implemented.
Figure 2:
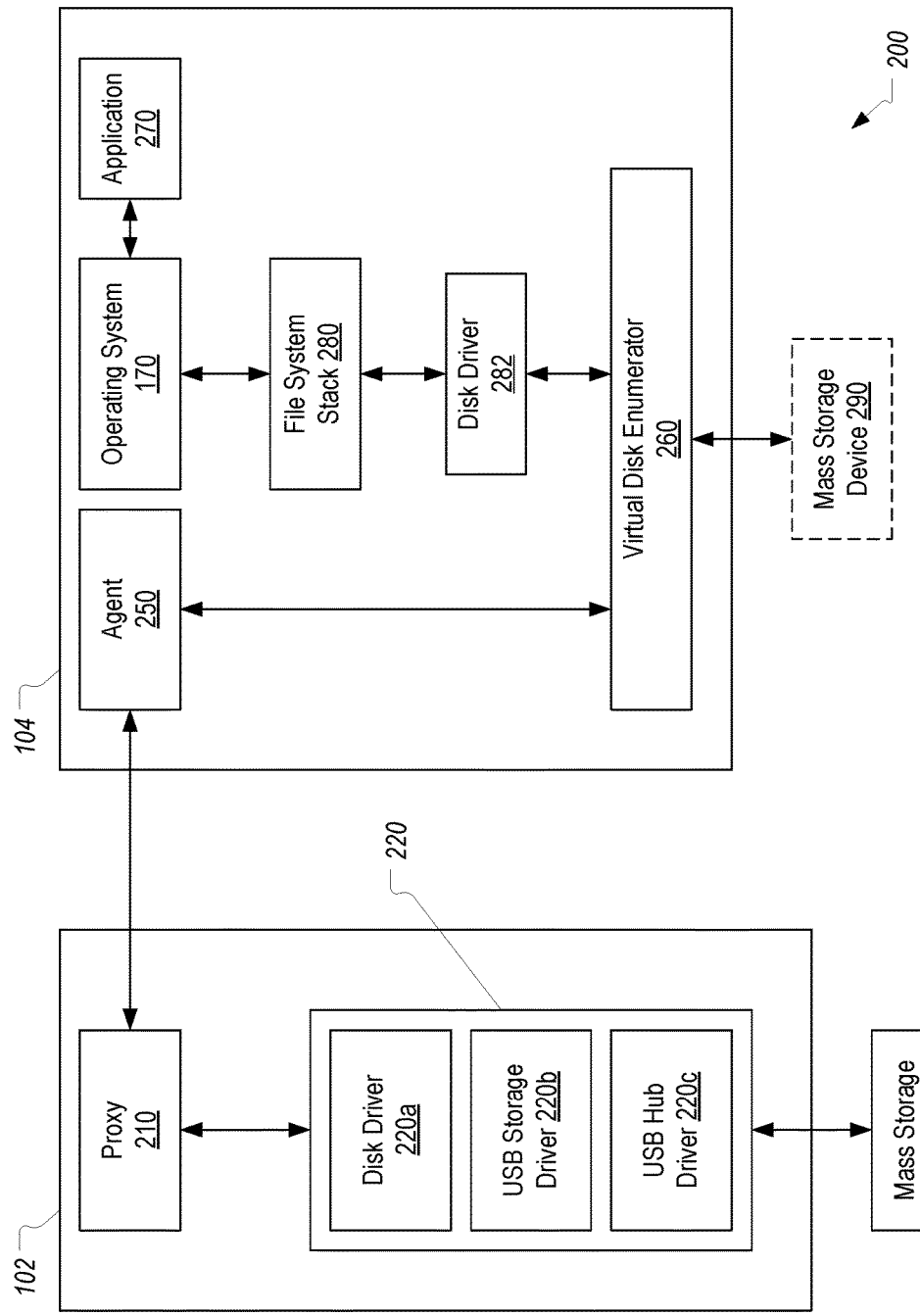
FIG. 2 illustrates how a mass storage device connected to a client can be redirected over a remote session to the server.

Turning to FIG. 3A, it is noted that client terminal 102 is depicted as including the same general components as is shown in FIG. 2. In particular, disk driver stack 220 (hereinafter USB stack 220) is shown as being loaded when USB mass storage device 340 is connected to client terminal 102. In contrast to FIG. 2, it is now assumed that a SAS (or SSA) mass storage device 341 and another mass storage device 342 that employs a different interface (e.g., Firewire) are also connected to client terminal 102. As a result, SAS stack 221 (which may include disk driver 221a, SAS storage driver 221b, and PCIe (or equivalent) bus driver 221c) and other stack 222 (which may include disk driver 222a, other storage device 222b, and other bus driver 222c both of which are suitable for the particular interface of other mass storage device 342) are loaded. As indicated by the ellipsis, mass storage devices could be connected to client terminal via other interfaces as well in which case a stack suitable for the particular interface would be loaded. FIG. 3A is therefore intended to represent that mass storage devices using many different types of interfaces may be connected to client terminal for redirection purposes.

FIG. 3A also shows that a proxy 310, which can perform the same general functions as proxy 210 is described as performing in the background, executes on client terminal 102. As will be further described below, and in accordance with embodiments of the present invention, proxy 310 can further be configured to obtain "disk information" from any connected mass storage device and to provide this disk information to the server-side agent as part of a device connection notification.

Turning to FIG. 3B, and in contrast to FIG. 2, server 104 is shown as including a VMiniport enumerator 370 that interfaces with agent 350 for purposes of receiving device connection notifications, including at least a portion of the accompanying disk information, sent by proxy 310. VMiniport enumerator 370 can receive these device connection notifications regardless of the type of mass storage device that has been connected to client terminal 102. For purposes of the present discussion, the "type" of a mass storage device should be construed as the interface or storage bus type (collectively "interface") used by the mass storage device and would therefore include USB, SAS/SSA, SATA/eSATA, Firewire, Thunderbolt, etc.

Continuing the overview, based on the disk information included with a particular device connection notification, or more specifically, based on the interface (or storage bus type) defined in the disk information, VMiniport enumerator 370 can enumerate a device of the defined interface. As a result, a stack can be created that is specific to the specified interface. Accordingly, FIG. 3B shows that a number of stacks corresponding to the mass storage devices connected to client terminal 102 have been loaded on server 104.

For example, because mass storage device 340 is a USB device, a stack that includes USB VMiniport driver 360a, storport driver 360b, and disk driver 282a along with a partition manager, volume manager and file system stack 280a are loaded on server 104 thereby making virtual mass storage device 390 available. Similarly, a stack that includes SAS VMiniport driver 361a, storport driver 361b, and disk driver 282b along with a partition manager, volume manager, and file system stack 280b are loaded to cause virtual mass storage device 391 which represents SAS mass storage device 341 to appear on server 104. Further, a stack including other VMiniport 362a, storport 362b, and disk driver 282c along with a partition manager, volume manager, and file system stack 280c are loaded for other mass storage device 342 thereby causing virtual mass storage device 392 to appear on server 104. Each of these stacks can include an interface-specific VMiniport driver 360a, 361a, . . . 362a and storport driver 360b, 361b, . . . 362b that interface with agent 350 for the purpose of communicating IO requests to the corresponding redirected mass storage device.

FIGS. 4A-4G provide an example of the steps that can be performed on client terminal 102 and server 104 to redirect a mass storage device of any interface. Since these steps will be substantially the same regardless of the interface, an example where a single mass storage device is redirected will be provided. In this example, it will be assumed that both client terminal 102 and server 104 have operating systems that support the interface of the redirected mass storage device.

In FIG. 4A, it will be assumed that SAS mass storage device 341 has been connected to client terminal 102 while proxy 310 and agent 350 have established a remote display protocol connection and that client terminal 102 is configured to redirect mass storage devices. Accordingly, SAS stack 221 will have been loaded on client terminal 102. Then, in step 1, proxy 310 is shown as receiving disk information about SAS mass storage device 341. This disk information can be retrieved in any suitable manner such as via the SCSI INQUIRY or other command and/or by employing utilities provided by the operating system on client terminal 102. This "disk information" can include a number of different types of information such as, for example, the type of interface used by the mass storage device (which in this case will be assumed to be SAS (or serial-attached SCSI)), disk-related details such as sector size, number of sectors, disk size, etc., various hardware identifiers, etc. In short, disk information can include sufficient information to allow the server-side VDI components to load an appropriate stack on server 104 as will be described in detail below. Although not shown in these figures, proxy 310 can preferably obtain exclusive access to disk driver 221a to ensure that no other client-side applications can access SAS mass storage device 341.

Figure 4B:
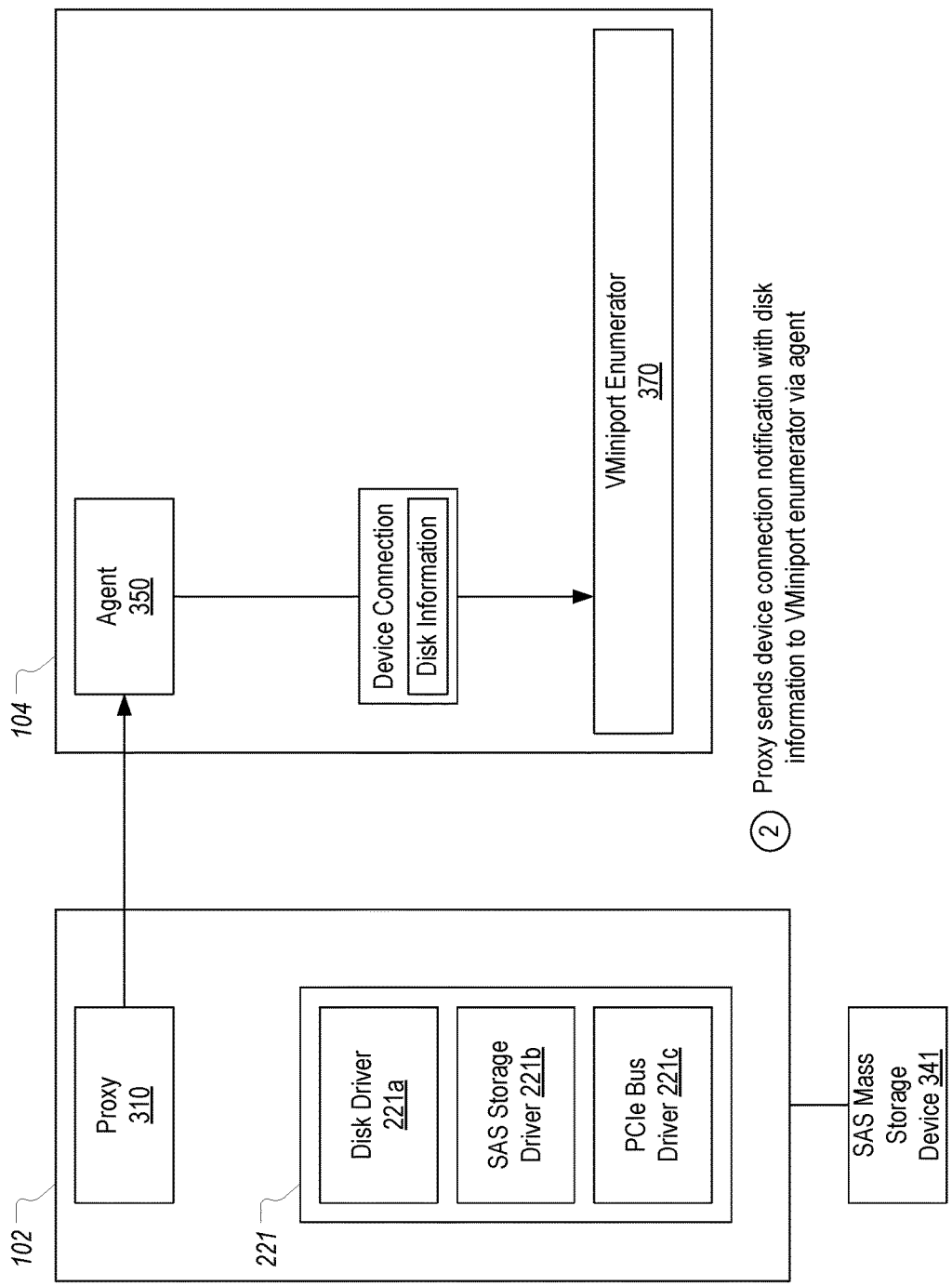

In step 2 as shown in FIG. 4B, proxy 310 sends a device connection notification, which includes the disk information, to agent 350. Agent 350 will in turn provide the device connection notification and at least some of the disk information to VMiniport enumerator 370. For example, agent 350 can provide enough of the disk information to allow VMiniport enumerator 370 to enumerate the appropriate interface.

Figure 4C:
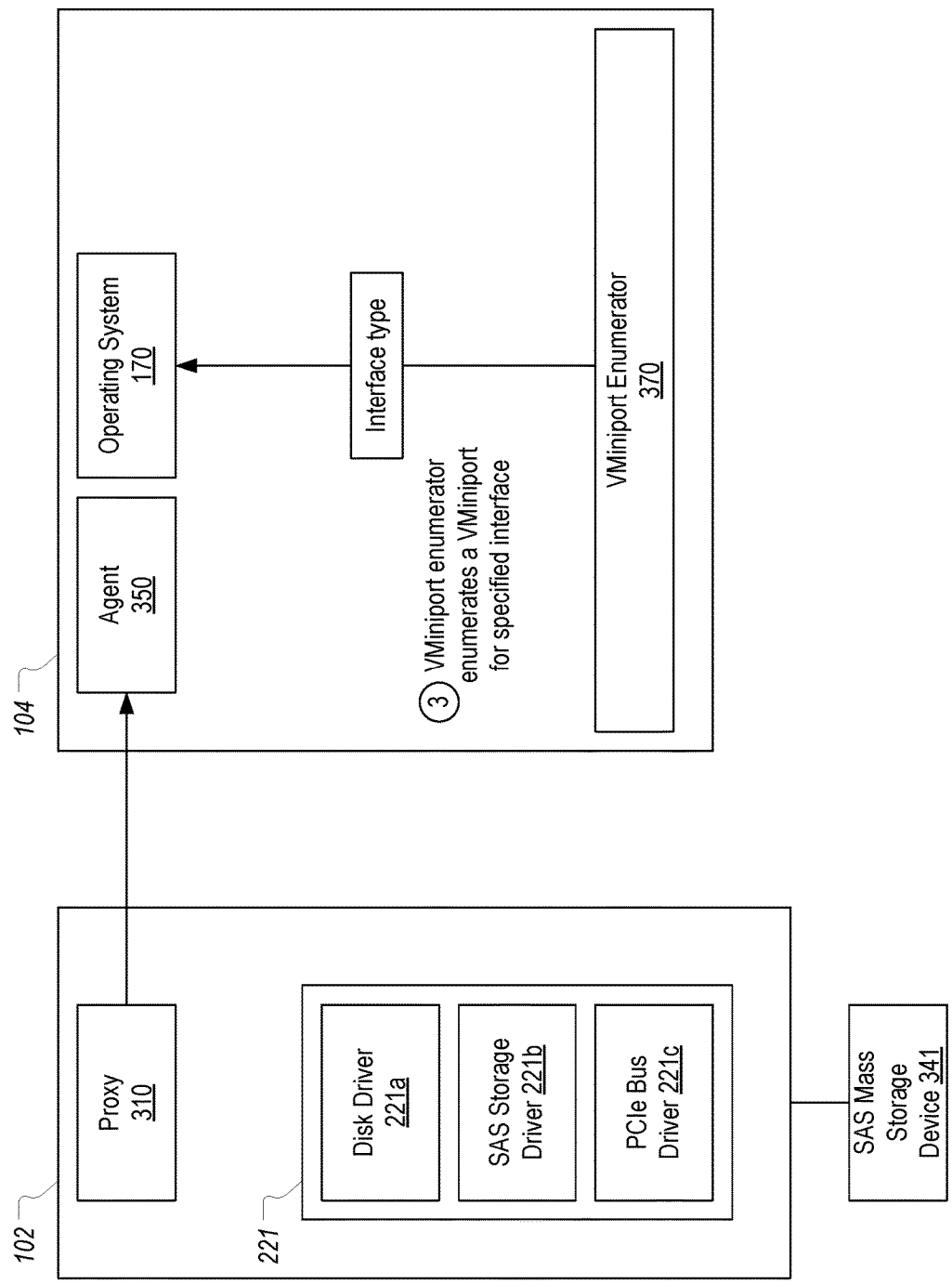
Figure 4D:
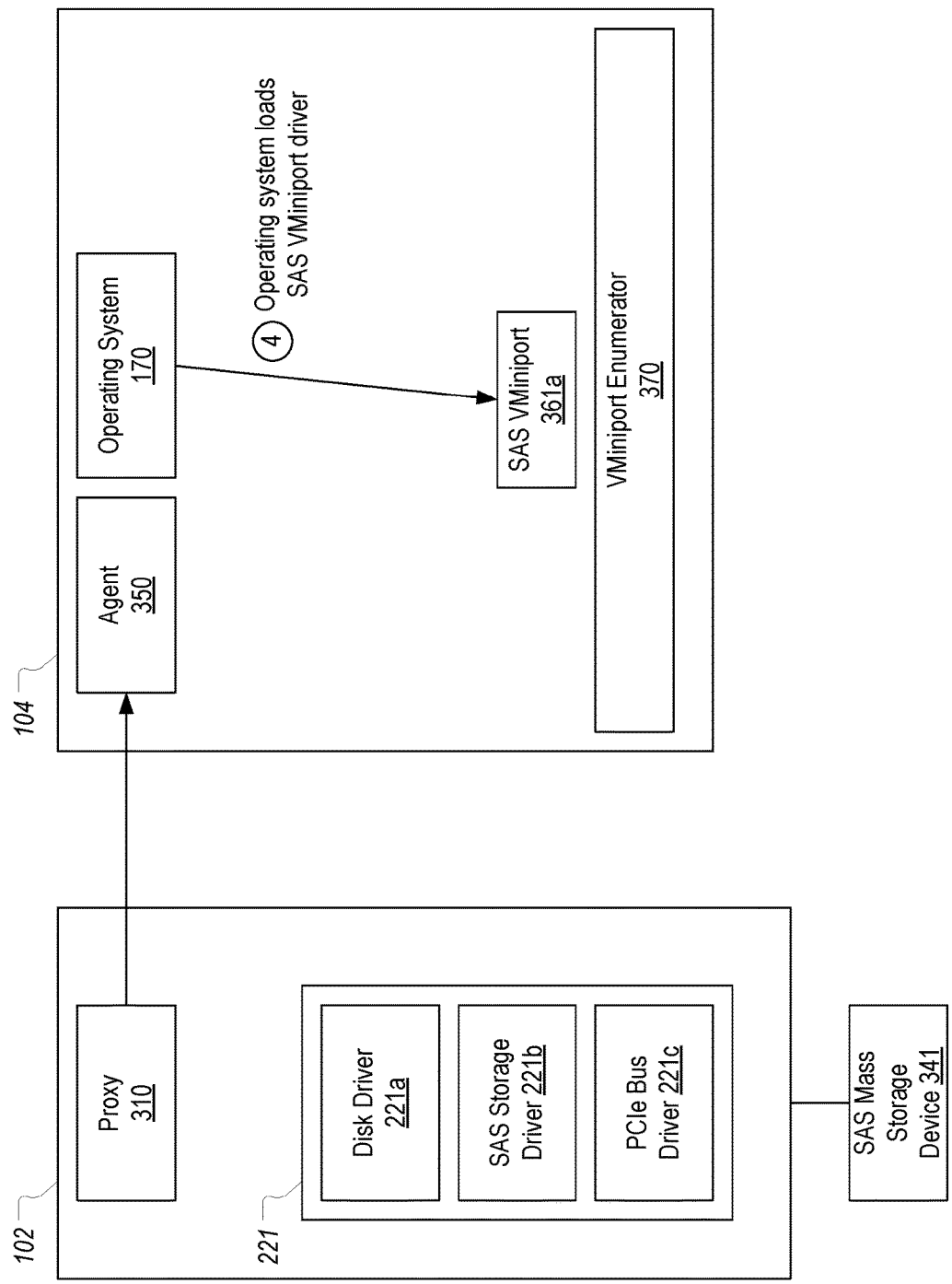

In step 3 as shown in FIG. 4C, VMiniport enumerator 370 enumerates a VMiniport driver for the appropriate type of interface which, in this case, is a SAS VMiniport driver. For example, VMiniport enumerator 370 can create a physical device object (PDO) using the STORAGE_BUS_TYPE enumeration set to the BusTypeSas (0x0A) constant. In response to the creation of this PDO, operating system 170 will load the VMiniport driver (which would have been previously registered for storage device PDOs) and configure it in accordance with the specified interface such that SAS VMiniport driver 361a is loaded as represented as step 4 in FIG. 4D. In other words, because proxy 310 has provided the disk information for SAS mass storage device 341, VMiniport enumerator 370 is able to cause operating system 170 to load a VMiniport driver that is specific to the interface defined in the disk information. Therefore, if the disk information had instead specified a SATA interface, VMiniport enumerator 370 could have instead created a PDO using a value of BusTypeSata (0x0B) for the STORAGE_BUS_TYPE enumeration. Accordingly, VMiniport enumerator 370 can cause a VMiniport driver specific to any of the interfaces defined in the STORAGE_BUS_TYPE enumeration (or an equivalent data structure) to be loaded. In this way, an appropriate VMiniport driver will be loaded for any type of interface of a mass storage device that may be connected to client terminal 102.

Figure 4E:
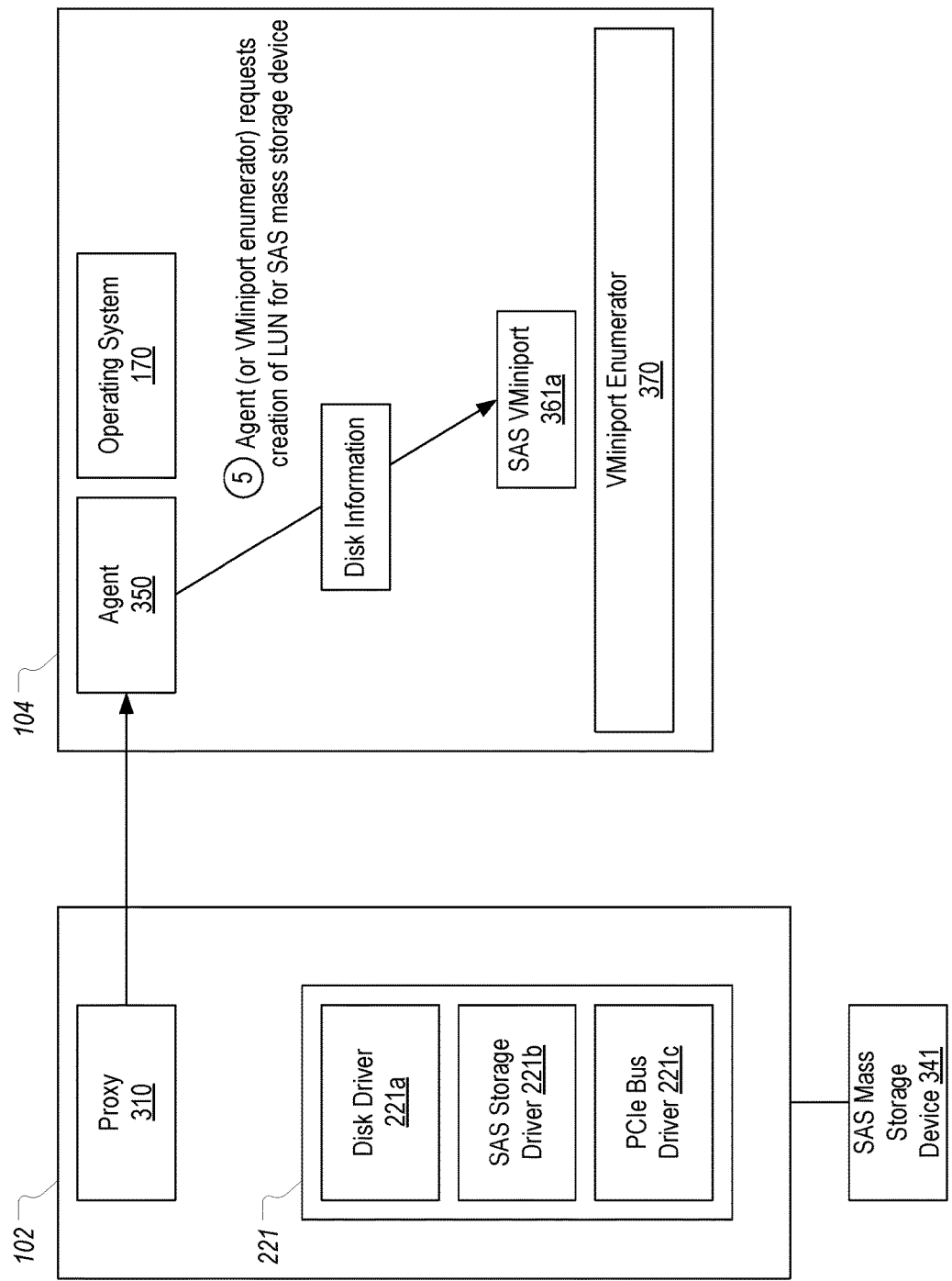
Figure 4F:
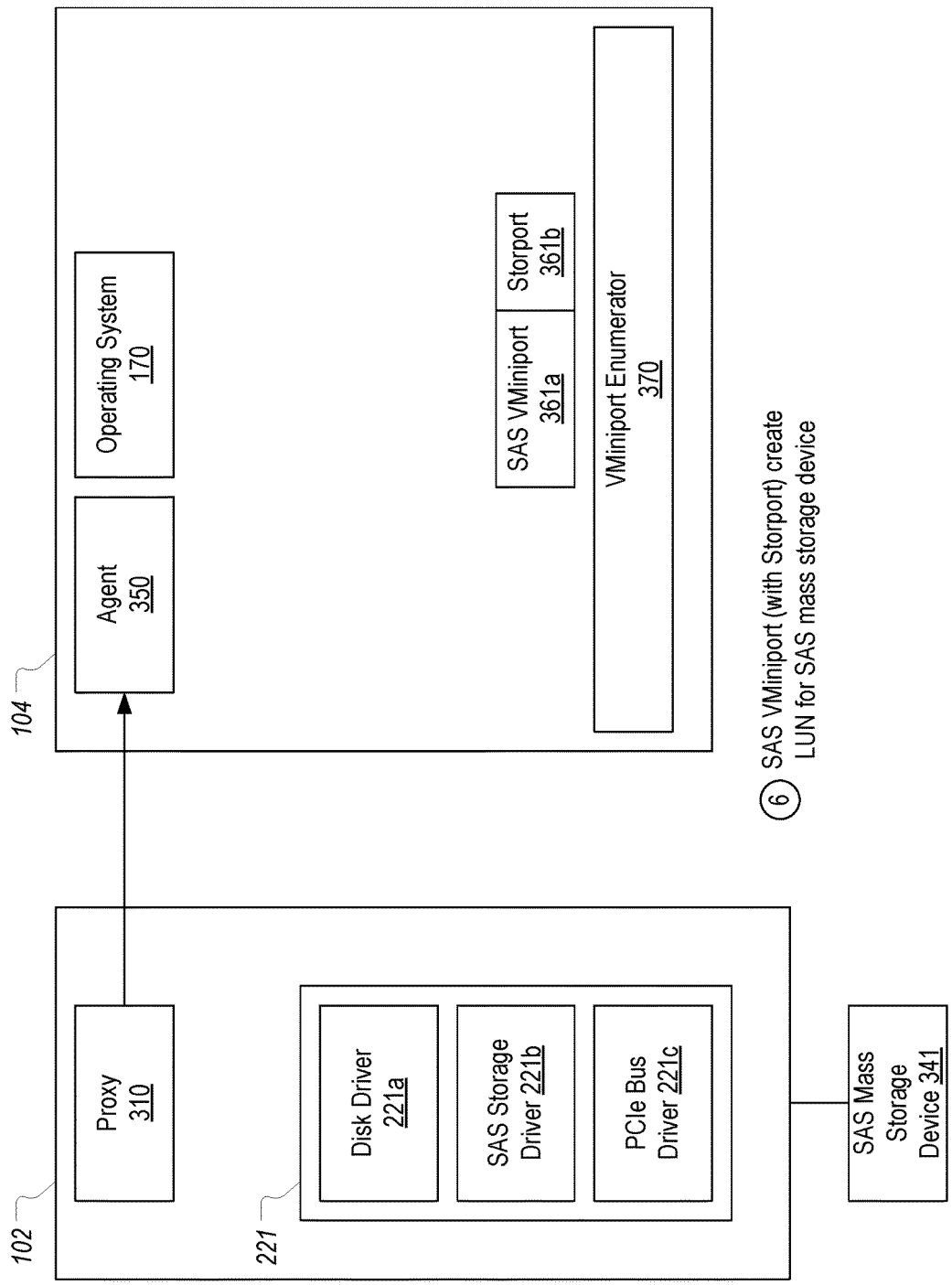

As part of loading/initializing a VMiniport driver, a corresponding storport driver will also be loaded and initialized. To ensure that this initialization is performed appropriately for the type of interface of the redirected mass storage device, agent 350 (or possibly VMiniport enumerator 370) can again employ the disk information to instruct SAS VMiniport driver 361a to create the storage device/storage logical unit(s) (or LUN(s)) appropriately. FIG. 4E therefore shows that agent 350 provides at least some of the disk information to SAS VMiniport driver 361a as part of a request to create the LUN(s) for SAS mass storage device 341.

Based on the disk information it receives, SAS VMiniport driver 361a can initialize fields of the VIRTUAL_HW_INITIALIZATION_DATA structure in conjunction with calling StorPortInitialize. For example, SAS VMiniport driver 361a can set the value of the AdapterinterfaceType field in this structure and can possibly set the value of a number of other fields in this structure to ensure that storport driver 361b will be initialized to properly function with SAS VMiniport 361a. As part of this process, storport driver 361b may also set values of the PORT_CONFIGURATION_INFORMATION structure in accordance with the disk information. For example, storport driver 361b can set the AdapterinterfaceType field in this structure to correspond with the value of the AdapterinterfaceType field specified in the VIRTUAL_HW_INITIALIZATION_DATA structure.

As is known, both the VIRTUAL_HW_INITIALIZATION_DATA structure and the PORT_CONFIGURATION_INFORMATION structure include a number of fields whose values depend on the type of interface of the mass storage device. In addition to the AdapterinterfaceType field described above, values for vendor Id, device Id, maximum transfer length, and maximum number of concurrent IO requests can be specified in these structures based on the disk information. For this reason, agent 350 can provide the disk information for the particular mass storage device to allow these fields to be populated appropriately by SAS VMiniport 361a and storport 361b.

Figure 4G:
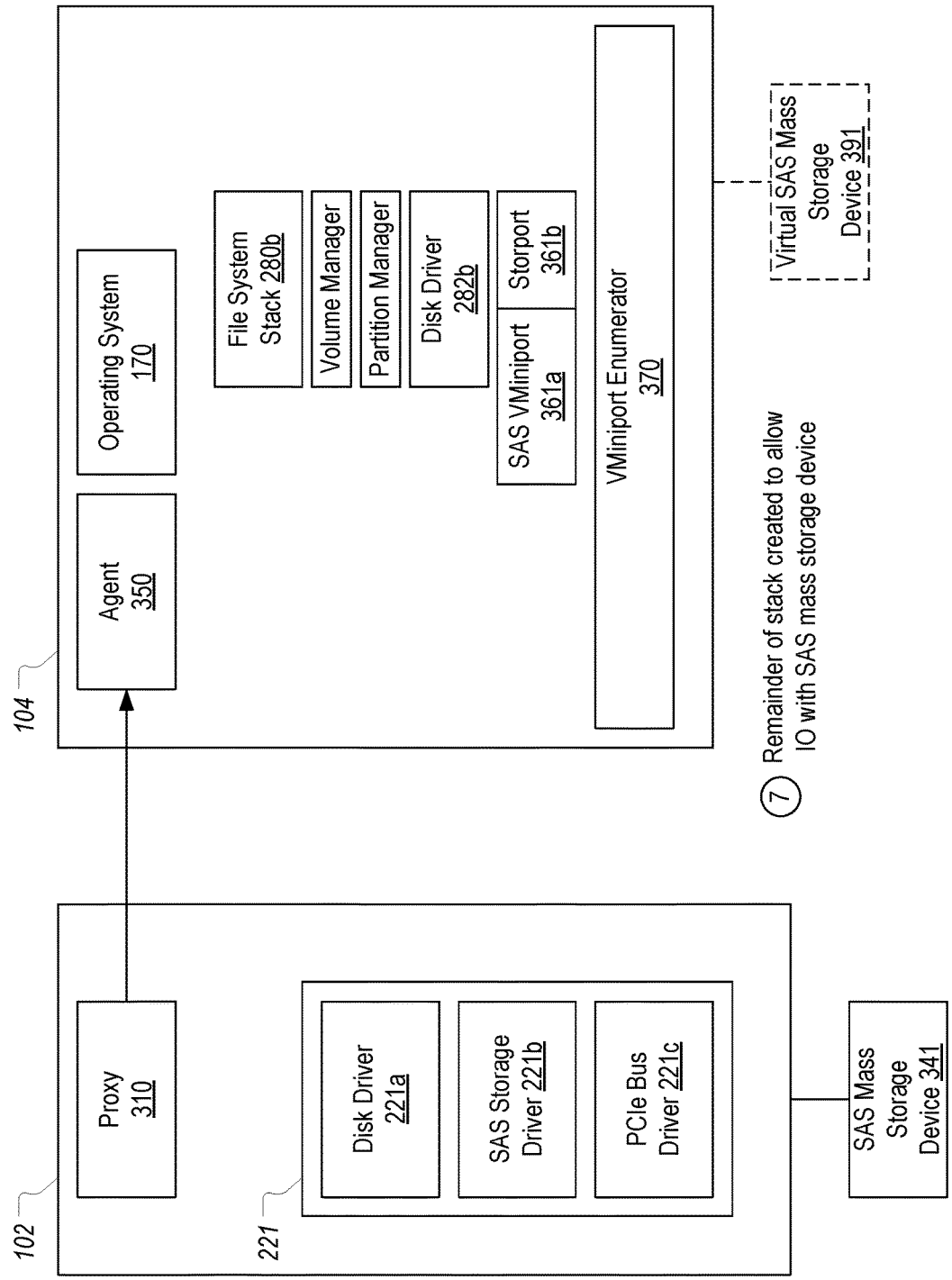

Finally, as shown in step 7 of FIG. 4G, with SAS VMiniport driver 361a and storport 361b initialized based on the disk information, the remainder of the device stack (e.g., disk driver 282b) and file system stack 280b can be loaded. Once these components are loaded, applications on server 104 will be able to access SAS mass storage device 341 (which will be seen as a virtualized SAS mass storage device 391) in a typical manner. This same process would be carried out if a mass storage device with a different interface is connected to client terminal 102. In such a case, VMiniport enumerator 370 would create a PDO for the different interface causing a VMiniport/storport driver specific to the different interface to be loaded using the disk information as reported by proxy 310.

Returning to FIG. 3B, once a mass storage device has been virtualized on server 104, IO to that mass storage device will be carried out via the corresponding VMiniport and storport drivers. For example, IO targeting SAS mass storage device 341 would be passed down through file system stack 280b and disk driver 282b to storport driver 361b and ultimately SAS VMinport driver 361a. Because storport driver 361b and VMiniport driver 361a will be configured for the SAS interface, they will format the IO requests (e.g., the IRP content) appropriately for the SAS interface. SAS VMiniport 361a can then route the IO requests (i.e., sufficient information to allow the IO requests to be recreated on client terminal 102) to agent 350 for delivery to proxy 310.

If SAS mass storage device 341 is disconnected from client terminal 102, proxy 310 can notify agent 350. In response, agent 350 can instruct SAS VMiniport driver 361a to remove virtualized mass storage device 391. When SAS VMiniport driver 361a removes the virtualized device (e.g., by deleting the corresponding device objects), operating system 170 will ensure that the upper layers (e.g., disk driver 282b and file system 280b) are unloaded thereby preventing applications from attempting to access the now-disconnected mass storage device.

Figure 5:
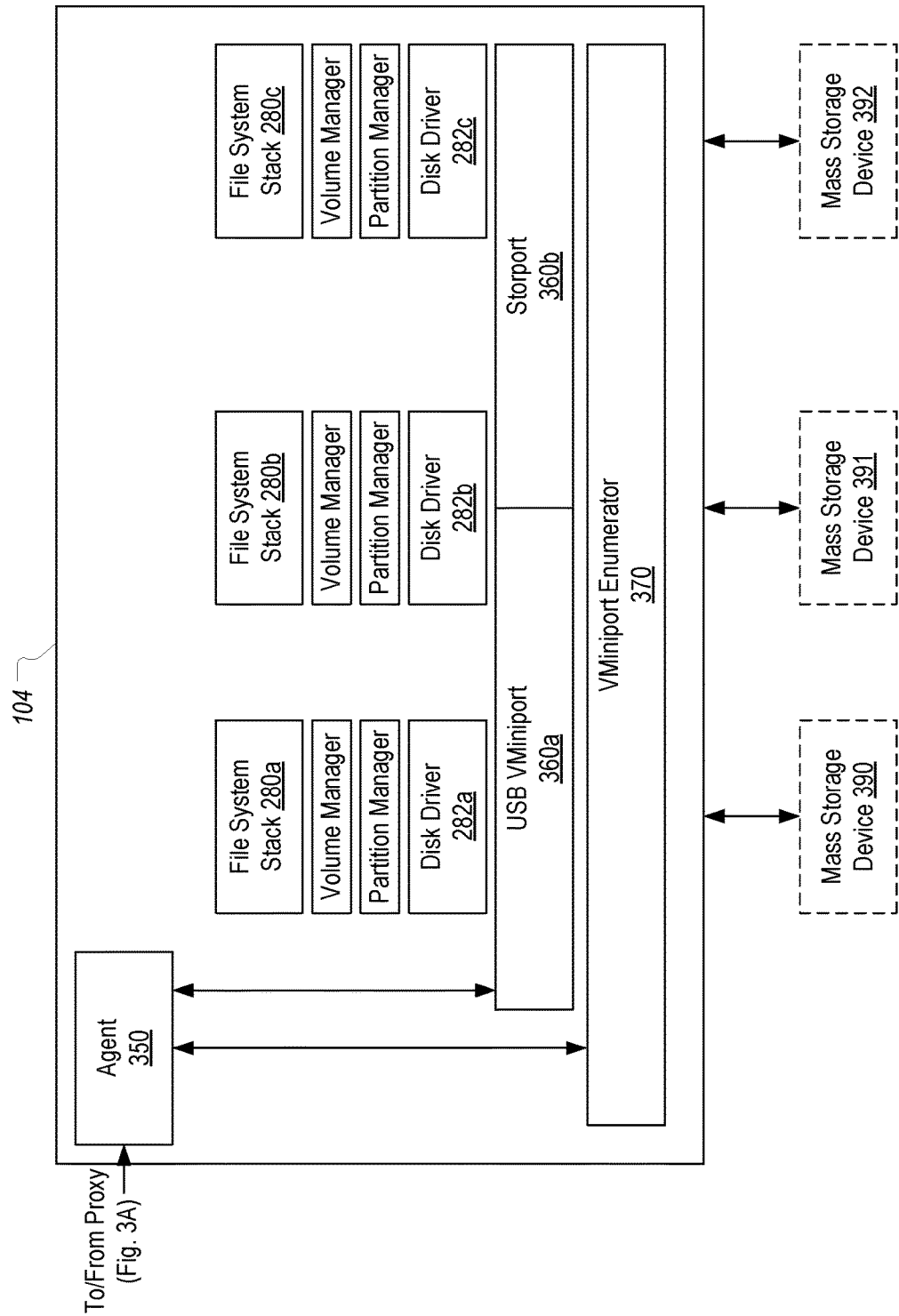
FIG. 5 illustrates how a mass storage device of an interface that is not supported by the server can be redirected to the server.

In the above described embodiments, it was assumed that operating system 170 supports all of the interfaces of mass storage devices that may be connected to client terminal 102. However, in some scenarios, this may not be the case. For example, if server 104 is running an older version of Windows (e.g., Windows Server 2003) while client terminal 102 is running a newer version of Windows (e.g., Windows 10), server 104 may not support some of the newer mass storage device interfaces such as Thunderbolt, 1394 Firewire, etc. that client terminal 102 supports. Even in such scenarios, the present invention can be employed to allow a mass storage device of any interface to be redirected to server 104. FIG. 5 illustrates how this can be achieved.

In FIG. 5, it will be assumed that client terminal 102 is configured in the same manner as shown in FIG. 3A (except for the additional functionality of proxy 310 as will be described below) and that operating system 170 does not support the same interfaces that the operating system on client terminal 102 supports. As an example only, it will be assumed that operating system 104 supports USB but not SAS or other interfaces. In this scenario, the process described above with respect to FIGS. 4A-4G will not work since a SAS VMiniport/storport driver or other VMiniport/storport driver will not be available on server 104.

To address this, agent 350 can be configured to detect which interfaces are not supported on server 104. Then, when agent 350 receives a device connection notification from proxy 310 that specifies an unsupported interface in the disk information, agent 350 can modify the disk information to instead specify a supported interface. For example, when operating system 170 is Windows Server 2003 and agent 350 receives disk information specifying Thunderbold, agent 350 may replace Thunderbolt with USB in the disk information. Agent 350 may also replace any other elements of the disk information that are specific to the unsupported interface or that would need to be replaced (or added) to comply with the supported interface. In short, agent 350 can convert the disk information to represent an interface that would be supported on server 104.

As a result of this modification to the disk information, only supported stacks will be created on server 104. For example, as shown in FIG. 5, even though mass storage devices 341 and 342 are not USB devices, by modifying the corresponding disk information to specify a USB interface (and possibly a number of USB parameters), the stacks loaded for mass storage devices 341 and 342 will be USB stacks. In particular, at the bottom of each of the three depicted stacks are USB VMinport driver 360a and storport driver 360b.

Of course, causing USB stacks to be loaded for non-USB mass storage devices will create a mismatch between the format of IO requests generated on server 104 and the format expected on client terminal 102. For example, IO requests targeting SAS mass storage device 341 will be structured as USB request blocks (URBs). If such IO requests were delivered to SAS stack 221, they would not be understood and would therefore fail. Accordingly, in these embodiments, proxy 310 can be further configured to convert IO requests from the server-side format to an appropriate client-side format. For example, proxy 310 can be configured to convert IO requests containing URBs targeting SAS mass storage device 341 into IO requests suitable for SAS storage driver 221b (e.g., by extracting a SCSI Command Descriptor Block from a URB and packaging it in the format expected by the client-side stack for the targeted mass storage device).

This technique of converting 10 requests from one interface to another (or more properly, employing information defining an IO request pertaining to one interface to create an equivalent IO request pertaining to another interface) can be performed by proxy 310 in a manner that is transparent to the server-side components. For example, to operating system 170 SAS mass storage device 341 (or any other mass storage device having an interface that the operating system does not support) will appear as a USB device and can therefore be accessed in a typical USB manner by the server-side applications.

This same conversion technique can even be employed when the operating system of client terminal 102 is not Windows (which would cause a mismatch between the client-side non-Windows stack and the server-side Windows file system). In such cases, the conversion performed by proxy 310 would also entail converting file system offsets to block numbers so that the block-based non-Windows stack could properly handle IO requests. As such, the conversions performed by proxy 310 can include conversions based on a mismatch between the interface of the server-side stack and the actual interface of the mass storage device as well as a mismatch between the server-side file system and the client-side stack.

Figure 6:
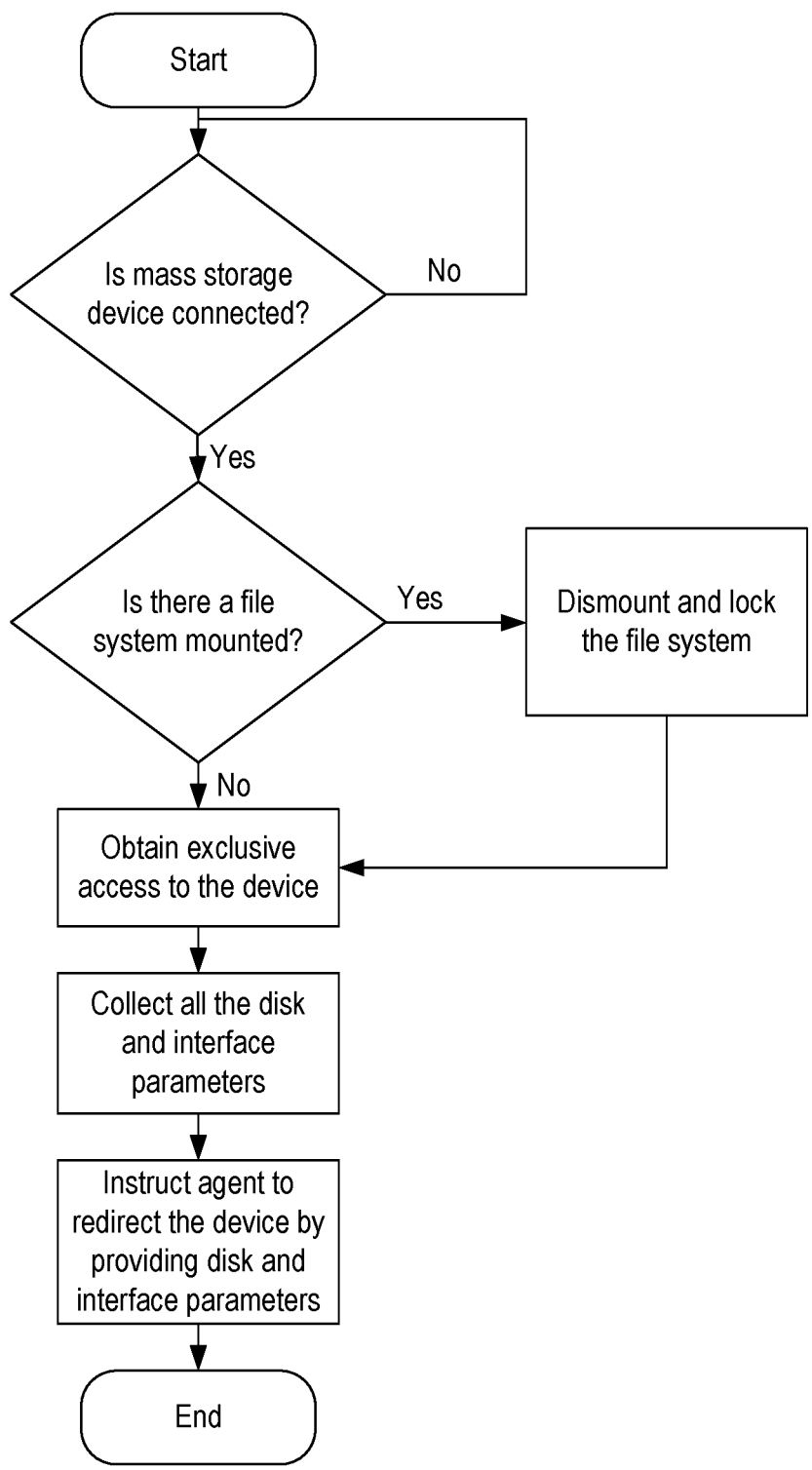
FIG. 6 provides flow diagram of a process performed by the client-side proxy to redirect a mass storage device of any interface to the server.
Figure 7:
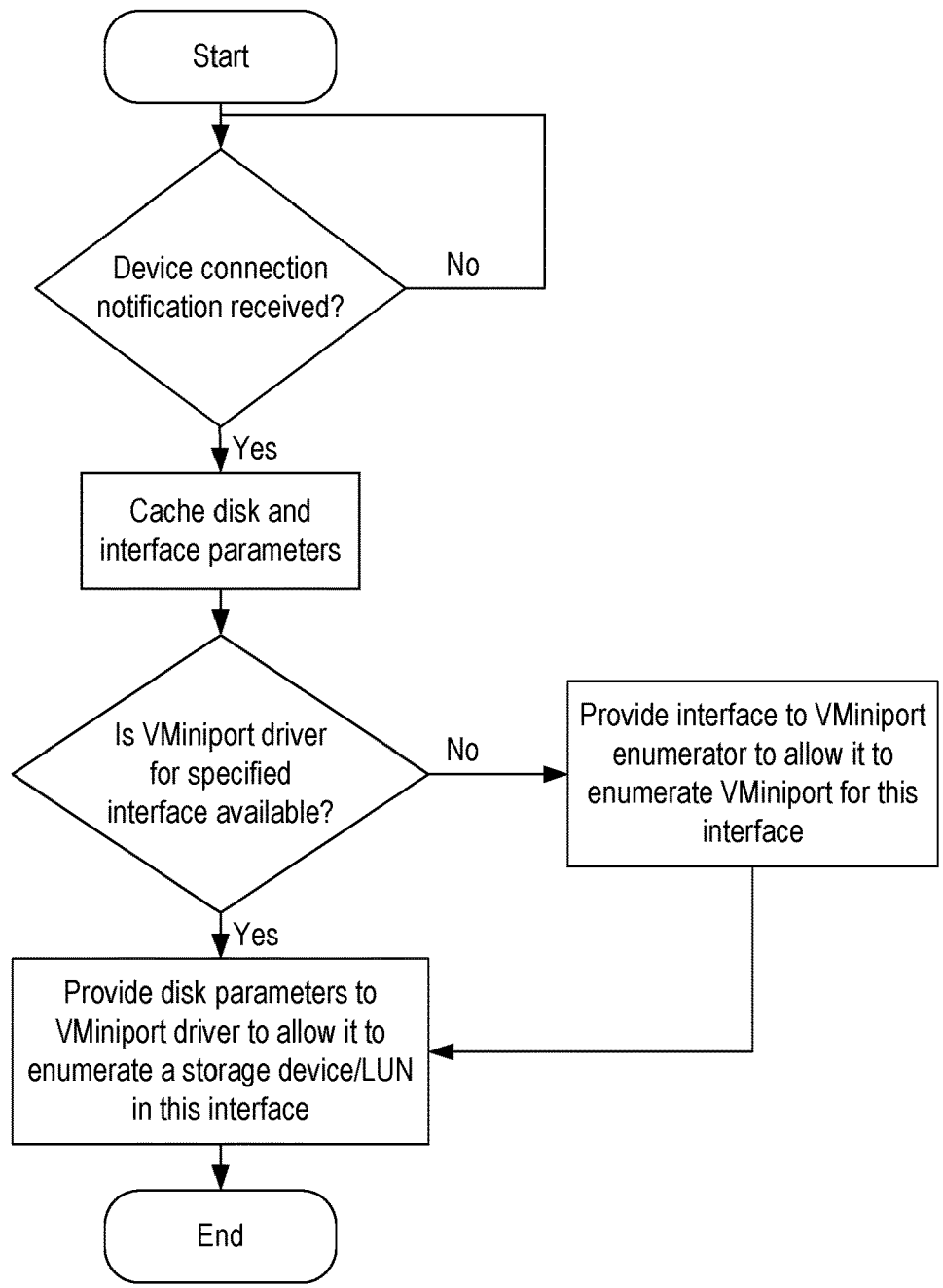
FIG. 7 provides a flow diagram of a process performed by server-side VDI components to redirect a mass storage device of any interface.

FIGS. 6 and 7 provide flowcharts to summarize the above described processes. FIG. 6 represents the steps that proxy 310 can perform when a mass storage device is connected to a client terminal. Proxy 310 can periodically determine whether a mass storage device has been connected. If so, proxy 310 can ensure that a file system is not mounted locally, and, if one is mounted, dismount it and block it from being again mounted. If no file system is mounted (or if one has been dismounted), proxy 310 can obtain exclusive access to the device and collect all the necessary disk and interface information to enable redirection. Finally, proxy 310 can provide the disk information, including the interface, to agent 350 as part of notifying agent 350 that the mass storage device has been connected and should be redirected.

FIG. 7 continues the process of FIG. 6 by determining, by agent 350, whether a device connection notification has been received from proxy 310. If so, agent 350 can cache the disk information. Agent 350 can then determine whether a VMiniport driver has already been loaded for this type of interface. If not, the interface (and possibly other information including in the disk information) can be provided to VMiniport enumerator 370 as part of a request to create a VMiniport driver for the specified interface. Finally, the disk parameters can be provided to the VMiniport driver to allow it to enumerate a storage device (or LUN(s)) in the specified interface.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented in a virtual desktop infrastructure environment, for redirecting a mass storage device, the method comprising:
providing, on a server, and agent and a VMiniport enumerator, the agent being configured to communicate with a proxy on a client terminal to enable redirection of mass storage devices that employ various different interfaces to connect to the client terminal, the VMiniport enumerator being configured to enumerate VMiniport drivers that are specific to the various different interfaces;
in response to a first mass storage device being connected to the client terminal with which the server has established a remote display protocol connection, receiving, at the agent, disk information about the first mass storage device, the disk information specifying a first interface of the various different interfaces by which the first mass storage device is coupled to the client terminal;
providing, by the agent and to the VMiniport enumerator, at least a portion of the disk information that the agent received from the client terminal, the portion of the disk information including the first interface by which the first mass storage device is coupled to the client terminal; and
determining, by the VMiniport enumerator, that the portion of the disk information received from the agent includes the first interface rather that another interface of the various different interfaces;
based on the determination, causing, by the VMiniport enumerator a VMiniport driver specific to the first interface to be loaded and initialized on the server.

2. The method of claim 1, further comprising:
causing a corresponding storport driver specific to the first interface to be loaded and initialized on the server.

3. The method of claim 2, wherein causing the VMiniport and storport drivers specific to the first interface to be initialized comprises setting a value of an adapter interface type field based on the first interface.

4. The method of claim 3, wherein the adapter interface type field is the AdapterinterfaceType field of a data structure employed by the VMiniport driver or the storport driver.

5. The method of claim 4, wherein the AdapterinterfaceType field is set in one or both of the VIRTUAL_HW_INITIALIZATION_DATA or PORT_CONFIGURATION_INFORMATION structures.

6. The method of claim 2, wherein the disk information includes one or more of a vendor Id, a device Id, a maximum transfer length, or a maximum number of concurrent IO requests, and wherein causing the VMiniport and storport drivers specific to the first interface to be initialized comprises providing one or more of the vendor Id, the device Id, the maximum transfer length, or the maximum number of concurrent IO requests to the VMiniport driver.

7. The method of claim 6, wherein the one or more of the vendor Id, the device Id, the maximum transfer length, or the maximum number of concurrent IO requests are set in one or more data structures employed by the VMiniport driver or a corresponding storport driver.

8. The method of claim 1, wherein causing the VMiniport driver specific to the first interface to be loaded and initialized on the server comprises creating, by the VMiniport enumerator, a device object on the server for the first mass storage device.

9. The method of claim 1, wherein the first interface is an interface other than USB.

10. The method of claim 1, wherein the first interface comprises a storage bus.

11. The method of claim 1, further comprising:
receiving, at the VMiniport driver, TO requests; and
routing the IO requests to the agent for delivery to the client terminal.

12. The method of claim 1, further comprising:
receiving, at the agent, second disk information about a second mass storage device, the second disk information specifying a second interface by which a second mass storage device is coupled to the client terminal;

providing, by the agent and to the VMiniport enumerator, at least a portion of the second disk information, the portion of the second disk information including a different interface than the second interface; and employing, by the VMiniport enumerator, the different interface to cause a VMiniport driver specific to the different interface to be loaded and initialized on the server.

13. The method of claim 12, wherein the agent provides the different interface in response to determining that the second interface specified in the second disk information is not supported on the server.

14. The method of claim 12, further comprising:
receiving, at the proxy, IO requests that are formatted in accordance with the different interface; and
converting the IO requests into a format that is supported by the second interface.

15. The method of claim 14, wherein the IO requests are also formatted in accordance with a server-side file system, the method further comprising:
converting the IO requests into a format that is supported by a client-side block device driver.

16. One or more computer storage media storing computer executable instructions which when executed implement the following components of a virtual desktop infrastructure:
a proxy that is configured to execute on a client terminal and to obtain disk information about a mass storage device that is connected to the client terminal, the disk information specifying by which interface of various different interfaces the mass storage device is coupled to the client terminal;
an agent that is configured to execute on a server and to establish a remote display protocol connection with the proxy, the agent being further configured to receive the disk information; and
a VMiniport enumerator that is configured to execute on the server and to receive the disk information from the agent, the VMiniport enumerator being further configured to evaluate the disk information to determine by which interface of the various different interfaces the mass storage device is coupled to the client terminal, the VMiniport enumerator being further configured to cause in response to the determination, a VMiniport driver specific to the determined interface to be loaded on server.

17. The computer storage media of claim 16, wherein the agent or the VMiniport enumerator is further configured to provide at least some of the disk information to the VMiniport driver to cause the VMiniport driver to be initialized in accordance with the provided disk information.

18. The computer storage media of claim 17, wherein a corresponding storport driver is also initialized in accordance with the provided disk information.

19. The computer storage media of claim 16, wherein the agent is further configured to receive additional disk information specifying a particular interface by which a second mass storage device is coupled to the client terminal, determine that the server does not support the particular interface specified in the additional disk information, to change the unsupported interface to an interface of the various different interfaces that is supported by the server, and to provide the supported interface to the VMiniport enumerator rather than the unsupported interface.

20. A method, performed by a virtual desktop infrastructure, for redirecting a mass storage device, the method comprising:
providing, on a server, an agent and a VMiniport enumerator, the agent being configured to communicate with a proxy on a client terminal to enable redirection of mass storage devices that employ various different interfaces to connect to the client terminal, the VMiniport enumerator being configured to enumerate VMiniport drivers that are specific to the various different interfaces;
in response to a mass storage device being connected to the client terminal, determining, by the proxy on the client terminal, a particular interface of the various different interfaces by which the mass storage device is connected to the client terminal;
sending, by the proxy, the particular interface to the agent on the server;
sending, by the agent, a request to create a VMiniport driver to the VMiniport enumerator, the request including the particular interface;
determining, by the VMiniport enumerator, that the request to create the VMiniport driver includes the particular interface rather that another interface of the various different interfaces; and
creating, by the VMiniport enumerator, a device object corresponding to the particular interface.

* * * * *